United States Patent

[11] 3,596,148

[72] Inventors James B. McNeely
St. Charles;
Donald A. High, Kirkwood, both of, Mo.
[21] Appl. No. 8,150
[22] Filed Jan. 19, 1970
[23] Division of Ser. No. 593,306, Nov. 10, 1968, Pat. No. 3,533,967.
[45] Patented July 27, 1971
[73] Assignee Monsanto Company
St. Louis, Mo.

[54] DOUBLE-DOPED GALLIUM ARSENIDE AND METHOD OF PREPARATION
3 Claims, No Drawings

[52] U.S. Cl. .......... 317/234 R, 317/234 V, 330/107 G
[51] Int. Cl. .......... H01p 9/00
[50] Field of Search .......... 317/237; 331/107 G

[56] References Cited
UNITED STATES PATENTS

| | | | |
|---|---|---|---|
| 3,322,501 | 5/1967 | Woodall | 317/235 |
| 3,439,236 | 4/1969 | Blicher | 317/235 |

OTHER REFERENCES

IEEE Transactions on Electron Devices, " Microwave Oscillations in High-Resistivity GaAs" by Day, Jan. 1966, pages 88— 94 331/1079.

*Primary Examiner*—Jerry D. Craig
*Attorneys*—John D. Upham, Herman O. Bauermeister and William I. Andress

ABSTRACT: Semiconductor grade gallium arsenide double-doped with oxygen and germanium, tin, sulfur, solenium or tellurium to a net carrier concentration of not greater than about $5\times10^{15}$ carriers/cc., and having resistivities of from 1—200 ohm-cm., and, preferably, from 1—15 ohm-cm. and having electron mobilities of at least 2000 and, preferably, 5000 cm.$^2$/volt sec. and above, is prepared by a gradient freeze crystallization process wherein ingots of high-yield essentially stoichiometric, single crystal gallium arsenide are provided.

DOUBLE-DOPED GALLIUM ARSENIDE AND METHOD OF PREPARATION

CROSS-REFERENCE TO RELATED APPLICATION

This application is a division of applicant's copending application, Ser. No. 593,306 filed Nov. 10, 1966 now U.S. Pat. No. 3,533,967.

SUMMARY

Elemental gallium is charged to a crucible in the crystallizer section of a gradient freeze reactor tube under vacuum from a decanter as the gallium reservoir. The crystallizer section, or gallium cell, is sealed off from the decanter and opened to a vacuum source. The gallium is vacuum baked and degassed at about 800° C. under $<1\times10^{15}$ mm. hg. for several hours. When Ge or Sn are used as one of the codopants with oxygen, these relatively nonvolatile elements are suitably added to the crucible prior to introduction of the gallium. When S, Se or Te are used as one of the codopants with oxygen, these relatively volatile elements in proper proportions are introduced into the gallium cell from a reservoir for these elements in communication with the gallium cell through a break-seal. After the nonoxygen codopant is added to the gallium cell, the latter is sealed off from the dopant reservoir and oxygen is the introduced into the gallium cell under oxygen pressures of up to about 100 mm. Hg. The gallium cell is then sealed off from the oxygen and vacuum sources. An arsenic cell containing the appropriate quantity of arsenic is then attached to gallium cell and in communication therewith through a break-seal. The arsenic cell is opened to a vacuum source and vacuum baked and degassed at about 350° for about 2 hours. The arsenic cell is then sealed off from the vacuum source. The arsenic cell and gallium cell thus connected are then places in abutting furnaces with separate heat control cycles for the arsenic cell which is located within the arsenic vaporizer furnace and the gallium cell which is located in the crystallizer furnace. The break-seal between the two cells is then opened. Power is turned on and the two furnaces are heated to predetermined temperature levels of about 630° C. for the arsenic vaporizer furnace, while the crystallizer furnace is heated through a gradient of from about 1240° C. to about 1280° across the length of the crucible containing the gallium. The arsenic is completely vaporized from the arsenic cell into the gallium cell to react with the gallium and form a liquid gallium arsenide melt. The thus-formed gallium arsenide doped with oxygen and Ge, Sn, S, Se or Te is then cooled and crystallized in the crystallizer furnace through a temperature gradient from one end of the crucible containing the gallium arsenide to the other. The resulting gallium arsenide ingot is then prepared by conventional techniques for testing of electrical properties, then sliced and/or diced as desired for fabrication of various semiconductor devices, e.g. Gunn-effect devices such as microwave oscillators.

DETAILED DESCRIPTION

This invention relates to a gradient freeze process for the preparation of gallium arsenide in high yield having properties suitable for various semiconductor devices and particularly suitable in Gunn-effect devices.

In recent years gallium arsenide has been found to be useful in a large number of semiconductor devices, such as transistors, varactors, tunnel diodes, optical filters, detectors, lasers, electroluminescent diodes, etc. One class of devices of great and widespread utility is the so-called Gunn-effect devices. In contrast to a number of semiconductor devices, e.g., transistors, varactors and tunnel diodes, a Gunn-effect device uses a thin wafer of uniform material with no PN junction. These devices have utility as oscillators and amplifiers and may be used in microwave applications. To use a Gunn-effect oscillator, a die of gallium arsenide with ohmic contacts of suitable material is placed in a resonant cavity and tuned to the desired operating frequency. A standard microwave detector is attached to the gallium arsenide component which is connected across the waveguide. A tunable section in the waveguide matches the device to the load. Oscillations occur when the DC voltage applied to the device raises the DC electric field beyond 3,000 volts/cm.

It has been suggested to use Gunn-effect oscillators as substitutes for reflex klystrons as local oscillators in both S-band and X-band radars, because of smaller power requirements of the Gunn-effect device, as well as relative freedom from random modulation with resulting better spectral purity. (See "Electronics,"p. 221, Aug. 8, 1966'). Also, as compared with transistors and tunnel diodes, Gunn-effect devices have higher power outputs at higher frequencies. In the 2- to 3- gigaHertz (GHz.) region the power is about 5—10 times above that of a tunnel diode.

With respect to gallium arsenide Gunn-effect oscillator devices it has been found that gallium arsenide having resistivities within the range of 1—200 ohm-cm. and, preferably, from 1—15 ohm-cm. and electron mobilities of > than 7000 and preferably 5000 cm.$^2$/volt sec. yields the best results. Gallium arsenide having resistivity values below 1 ohm-cm. in general require too much current in developing the threshold voltages for oscillation and have a high incidence of breakdown by overheating, unless pulsed on low duty cycles. The upper limit on resistivity is set by the $n$1 product where $n$ is the electron concentration and 1 is the length dimension parallel to current flow in the sample. A value of $n1\geq\sim10$ inches has been arrived at theoretically, and experimentally determined, as the minimum number of charge carriers required to sustain oscillations in a sample. A gallium arsenide sample of 100 $\mu$ requires a resistivity of less than 125 ohm-cm. to sustain oscillations.

Heretofore it has not been known how to produce gallium arsenide having these required resistivities and mobilities in high yields and reproducibility.

Accordingly, it is an object of this invention to provide a process for reproducibly preparing gallium arsenide having resistivities within the range of from 1—200 ohm-cm., and preferably from 1—15 ohm-cm. and having electron mobilities > than 2,000 and preferably 5,000 cm.$^2$/volt sec.

Another object of this invention is to provide a double-doped gallium arsenide having properties particularly useful in Gunn-effect devices. Hence, a related object is to provide Gunn-effect devices which utilize double-doped gallium arsenide as the active component.

Still another aspect of this invention is the preparation of gallium arsenide having the above properties by means of a gradient freeze process.

These and other objects and advantages will become apparent as the description of the invention proceeds.

It has now been discovered that gallium arsenide having resistivities within the range of from 1—200 ohm-cm. and, preferably, within the range of from 1—15 ohm-cm. and having electron mobilities of at least 2,000 and preferably above 5000 cm.$^2$/volt sec. can be provided by means of a double-doping combination of oxygen and germanium, tin, sulfur, selenium or tellurium. The preferred doping combination which gives the best results is oxygen and tellurium at a net carrier concentration of not greater than $5\times10^{15}$ carriers/cc.

Gallium arsenide doped with the above or other elements individually and useful in a variety of utilities is known in the prior art. Also, various combinations of dopants have been used in gallium arsenide or other semiconductor materials to obtain specified effects for certain device utilities. For example, Winogradoff discloses (Solid State Communications, Vol. 2, pp. 119—122 (1964)) the use of both acceptor and donor impurities in tunnel diodes and electroluminescent devices such as lasers using gallium arsenide. Winogradoff used a P-type substrate having a combination of tellurium and zinc on the order of $10^{19}$ carriers/cc. to effect lasing across a PN junction where the epitaxial n-layer was Te-doped to $10^{19}$ carriers/cc. Hull (U.S. Pat. No. 3,179,541) discloses gallium arsenide doped with cadmium alone or together with another suitable dopant, e.g., a Group II element such as zinc, with carrier concentrations of $3\times10^{18}$ carriers/cc. and above, and electron mobilities on the order of 100 cm.$^2$/volt sec. and suitable for use in tunnel diodes. Stern et al. (U.S. Pat. No. 3,116,260) disclose various III–V semiconductors, e.g., indium arsenide, having equal numbers of acceptor and donor impurities, e.g., sulfur and zinc, respectively, on the order of $5\times10^{18}$ atoms/cc. and useful as photodetectors or filters in the infrared region of the light spectrum. Jones et al. (U.S. Pat. No. 3,092,591) disclose gallium arsenide doped to degeneracy with selenium, tellurium or zinc with from $10^{19}$ to $5\times10^{19}$ carriers/cc. and useful as tunnel diodes.

It has not, however, been disclosed in the prior art, to our knowledge, to provide gallium arsenide doped with both oxygen and germanium, tin, sulfur, selenium or tellurium at net carrier concentrations of less than about $5\times10^{15}$ and having resistivities of from 1—200 and preferably from 1—15 ohm-cm. and electron mobilities of <2,000 and preferably above 5,000 cm.$^2$/volt sec.

According to the present invention single crystal gallium arsenide having the described properties is prepared by a gradient freeze process described below.

As a general description of the process, elemental gallium is charged to a quartz crucible situated in a sealed evacuated quartz cell by means of a decanter or gallium reservoir connected to an upper region of the quartz cell. The quartz components used herein have been previously prepared by sandblasting and thorough cleansing. When germanium or tin are to be used as one of the codopants with oxygen, the germanium or tin is preferably placed in the quartz crucible before the gallium is added from the decanter. When sulfur, selenium or tellurium are used as codopants with the oxygen, these relatively volatile elements are preferably introduced into the quartz cell containing the gallium from a separate closed reservoir for these elements connected to and communicable with the quartz cell through a break-seal. These dopants are introduced into the gallium cell by breaking the break-seal to the dopant reservoir with a magnetic breaker bar. Preferably and usually, the nonoxygen doping elements are added to the gallium cell prior to the introduction of the oxygen dopant as described below.

After the gallium has been introduced into the crucible in the quartz cell, the gallium decanter reservoir is removed by a flame torch applied to a necked down portion of the decanter connected with the gallium cell and the latter thus flame-sealed. The gallium cell is then opened to a vacuum source and the gallium is degassed to remove volatile oxides and other impurities under pressures of $<1\times10^{15}$ mm. Hg and temperatures of about 800° C. for several hours, e.g., from 12—24 hours. The gallium cell is then cut off from the vacuum source and one of the dopant elements S, Se or Te as the case may be is then introduced into the gallium cell by breaking the break-seal in the dopant reservoir and heating the latter to drive the element into the gallium cell. The dopant reservoir is then removed by flame heating a necked down section of the reservoir in communication with the gallium cell which is then sealed. Oxygen is then introduced into the gallium cell at oxygen pressures of less than 100 mm. hg. as measured by a manometer having a sensitivity of 0.05 mm. Hg. The oxygen source is then sealed off from the gallium cell. An arsenic cell containing a slight excess over that required to prepare stoichiometric gallium arsenide is attached to one end of the gallium cell and in communication therewith through a break-seal. Prior to reacting the arsenic and gallium, the arsenic cell is connected to a vacuum source, and the arsenic is degassed at about 350° C. under pressures of $<1\times10^{15}$ mm. hg. for 2 or more hours. During the arsenic degassing step a slight amount of arsenic is lost, the amount lost is equivalent to the excess of arsenic provided over that required for the stoichiometric gallium arsenide to be prepared. After degassing the arsenic, the arsenic cell is sealed off from the vacuum source.

The reactor tube now containing two sections, viz, the arsenic cell and the gallium cell (containing the oxygen and Ge, Sn, S, Se or Te dopants) is then placed in two split tube furnaces butted end to end. These furnaces are designated as an arsenic vaporizer furnace and a crystallizer furnace, respectively. Alternatively, a single furnace having multiple sections independently heat-controlled will suffice. The arsenic section of the reactor is placed in the arsenic vaporizer furnace and the gallium section is placed in the crystallizer furnace. With the reactor thus positioned in the furnaces, the break-seal between the arsenic and gallium cells is broken and the desired temperature control presettings are made and the power turned on. From here the temperature heat-up, reaction, and crystallization cooling rates are automatically controlled. The arsenic is completely vaporized into the gallium cell and reacts with the doped gallium under temperatures and arsenic pressures sufficient to provide a gradient temperature melt of gallium arsenide doped as described above. After sufficient time for the reaction proper and a soak period of several hours has elapsed, a thermocouple impulse controlling the crystallizer furnace passes through an electronic turndown mechanism, which allows the temperature of the crystallizer furnace to be decreased at a predetermined uniform rate.

The following specific examples will further illustrate and describe the invention herein disclosed.

EXAMPLE 1

Using the procedure and apparatus described above, 401.9 g. of purified gallium was charged to a quartz crucible 15 inches long situated in an evacuated quartz cell (described above as the gallium cell) which later is used as the crystallizer section of the reactor tube. The decanter from which the gallium is charged to the crucible is then removed by flame heating a necked down portion of the decanter communicating with and attached to the quartz gallium cell, thus sealing the latter. The gallium cell is then opened to a vacuum source and the gallium is vacuum baked and degassed to remove volatile impurities such as oxides under pressures of $<1\times10^{15}$ mm. hg. and a temperature of 800° C. for about 12 hours. The vacuum baking is discontinued and the break-seal connecting a tellurium reservoir with the gallium cell is broken with a magnetic breaker bar. The tellurium reservoir containing a quantity of elemental tellurium corresponding to a concentration of $5\times10^{16}$ atoms tellurium/cc. of the gallium arsenide metal (subsequently produced) is heated with a flame torch to vaporize and drive the tellurium into the gallium cell. Thereafter, the tellurium reservoir is removed from the gallium cell by flame heating a necked down portion of the reservoir connected to the gallium cell, while simultaneously sealing the latter. The gallium cell is then opened to an oxygen supply and oxygen is introduced into the cell under an oxygen pressure of 11 mm. Hg. The gallium cell is the sealed off from the oxygen supply.

An arsenic cell containing 432.3 g. of arsenic is attache to an extension on one end of the gallium cell and is in communication therewith through a break-seal. The other end of the arsenic cell is then attached to a vacuum source for the arsenic degassing operation. The arsenic cell is heated to 350° c. under a pressure of $< 1\times10^{15}$ mm. hg. for over 2 hours. The arsenic cell is then sealed off from the vacuum source by flame heating the connection thereto. During the degassing operation the arsenic lost is 0.5 g. in weight due to removal of impurities, leaving a net arsenic charge of 431.8 g. which is the quantity required for the preparation of stoichiometric gallium arsenide.

The arsenic cell-gallium unit now constitutes the gradient freeze reactor system. This reactor, charged with gallium and the dopants tellurium and oxygen in the gallium cell and elemental arsenic in the arsenic cell, is then placed in two furnaces butted end to end. The gallium cell portion of the reactor is placed in the crystallizer furnace and the arsenic cell portion of the reactor unit is placed in the arsenic vaporizer furnace. The break-seal separating the arsenic cell from the gallium cell and providing communication therebetween is then opened by means of a magnetic breaker bar Power to the two furnaces is now turned on and the arsenic vaporizer furnace temperature slowly raised to 630° C over a period of about three hours, while the crystallizer furnace is allowed to heat up to 1280° C ± 5° at essentially maximum rate. Under these conditions all the arsenic in the arsenic cell is vaporized and diffused into the gallium cell wherein the arsenic and gallium react to form a melt of gallium arsenide. This melt is allowed to soak at the above temperatures for two hours. Temperature levels in the crystallizer furnace wherein the crucible containing the gallium is situated are then adjusted to provide a temperature gradient of from about 1243° C. at the end of the crucible nearest the arsenic cell to about 1280° C. at the opposite end of the crucible. Thermocouples in contact with the gallium cell directly below the gallium crucible and spaced about 2—3 inches apart along the length of the crucible measure temperature levels of the gallium arsenide melt formed in the crucible. Thereafter, an automatic temperature programmer for the crystallizer furnace adjusts to permit a decrease in the temperatures at a slow turn down rate of from 0.3-2.0° C./hr. until the temperature gradient across the gallium arsenide melt reaches about 1193°—1230° C. The temperature programmer then adjusts to a fast turn down rate of about 100° C./hr. Meanwhile, the arsenic cell temperature was maintained at about 630° C. until about 1 hour after the end of the slow turn rate in the crystallizer furnace at which time temperatures with the arsenic cell were programmed to decrease at the same fast turn rate of 100° C./hr. used in the crystallizer furnace.

The gallium arsenide ingot obtained was 37.3 cm. long and weighed 831.0 g. This ingot had a small amount of polycrystallinity for about 3.5 cm. on one portion of the front (first to crystallize) end and a twin plane between about 5 and 8 cm. from the front end. The rest of the ingot was single crystal to about 36 cm. with a small amount of excess gallium on the last 1—2 cm. of the ingot. The gallium arsenide ingot prepared in this example was 75 —80 percent single crystal and was free of microcracks, blowholes, free gallium and gallium inclusions.

The ingot was evaluated for electrical properties at different places along the length of the ingot from front to back and typical values are shown in Table I below. In the table $R_H$ signifies Hall coefficient, $\rho$ is resistivity, $\mu$ is electron mobility, $\eta$ is net carrier concentration, and R.T. signifies room temperature.

TABLE I

| Position of measurement along ingot (cm.) | $R_H$ (cm.³/coulomb) R.T. | $\rho$ (ohm-cm.) R.T. | $\rho$ (ohm-cm.) 50° C. | $\mu$ (cm.²/volt sec.) R.T. | $\eta$ (n-type/cc.) R.T. |
|---|---|---|---|---|---|
| 1.2 | ........ | $9.7\times10^7$ | ........ | | ........ |
| 6.8 | ........ | $3.7\times10^7$ | ........ | | ........ |
| 3.0 | ........ | $4.7\times10^7$ | | | ........ |
| 9.5 | ........ | $2.4\times10^5$ | | | ........ |
| 10.0 | $-6.22\times10^3$ | 105 | ........ | 6,330 | $2.38\times10^{13}$ |
| 11.0 | $-1.60\times10^4$ | 2.60 | ........ | 6,150 | $3.93\times10^{14}$ |
| 13.0 | $-1.30\times10^4$ | 2.27 | 1.64 | 5,720 | $4.83\times10^{14}$ |
| 17.0 | $-1.21\times10^4$ | 1.92 | 1.42 | 6,320 | $5.16\times10^{14}$ |
| 22.5 | $-1.10\times10^4$ | 1.88 | 1.44 | 5,840 | $5.71\times10^{14}$ |
| 27.5 | $-1.20\times10^4$ | 2.26 | 1.67 | 5,330 | $5.22\times10^{14}$ |
| 30.1 | $-2.90\times10^4$ | 6.64 | 4.63 | 4,680 | $2.18\times10^{14}$ |
| 30.8 | $-4.19\times10^4$ | 12.2 | ........ | 3,430 | $1.59\times10^{14}$ |
| 31.4 | $-1.08\times10^4$ | 11.2 | 8.30 | 980 | $1.13\times10^{15}$ |
| 33.5 | $-193.3$ | .041 | .043 | 4,720 | $3.40\times10^{16}$ |
| 33.6 | $-235.3$ | .057 | .059 | 4,230 | $2.95\times10^{16}$ |

EXAMPLE 2

This example illustrates the preparation of gallium arsenide ingots doped with tellurium alone, i.e., with no added oxygen.

Using the same procedure and apparatus as in Example 1, except omitting the oxygen addition operation, 412.6 g. of gallium were charged to the crucible in the gallium cell. The gallium was vacuum baked and degassed as above and tellurium from the tellurium dopant reservoir was introduced into the gallium cell in a quantity corresponding to a concentration of $3\times10^{17}$ atoms tellurium/cc. of the gallium arsenide melt subsequently produced. Since undoped gallium arsenide generally has resistivities in the range of from about 0.04 to 0.4 ohm-cm., mobilities of less than about 5000 cm.²/volt sec. and carrier concentrations within the range of from above $5\times10^{15}$ to about $5\times10^{16}$ carriers/cc., it is necessary to dope the gallium arsenide to a charge concentration of greater than about $1\times10^{17}$ to obtain an appreciable electrical effect from the added tellurium dopant. 442.6 g. of degassed arsenic was then vaporized and diffused from the arsenic cell in the arsenic vaporizer furnace into the gallium cell situated in the crystallizer furnace. The arsenic, tellurium and gallium were reacted under substantially identical conditions as described in Example 1 to form a melt of tellurium-doped gallium arsenide. This melt was soaked for 20 hours then crystallized as in Example 1.

The gallium arsenide ingot obtained in this run was 37.6 cm. long and weighed 853.4 g., but was badly strained, although largely single crystal. Electrical properties of this ingot are shown in Table II below.

TABLE II

| Position on ingot (cm.) | $R_H$ (cm.³/coulomb) | $\rho$ (ohm-cm.) R.T. | $\mu$ (cm.²/volt sec.) | $\eta$ (n-type/cc.) |
|---|---|---|---|---|
| 1.0 | −1,308 | .3423 | 3,325 | $5.15\times10^{15}$ |
| 7.0 | −869.2 | .2470 | 3,525 | $7.37\times10^{15}$ |
| 11.0 | −288.7 | .0620 | 4,650 | $2.17\times10^{15}$ |
| 16.0 | −187 | .0776 | 2,210 | $4.09\times10^{16}$ |
| 31.0 | −666.7 | .2170 | 3,105 | $9.40\times10^{15}$ |
| 26.0 | −85.92 | .4251 | 335 | $7.61\times10^{16}$ |
| 21.0 | −88.12 | .0230 | 4,230 | $7.09\times10^{16}$ |
| 36.0 | −11.67 | .0039 | 2,905 | $5.68\times10^{17}$ |

The resistivities of the gallium arsenide are seen to be considerably below the minimum of 1 ohm-cm. required for the oxygen and tellurium double-doped gallium arsenide of this invention. Also, the carrier concentration is above the maximum of about $5\times10^{15}$ carriers/cc. required herein.

EXAMPLE 3

This example illustrates the preparation of gallium arsenide ingots doped with oxygen only.

Using the same procedure and apparatus described in Example 1, but omitting the tellurium addition operation, 405.2 g. of gallium were charged to the crucible in the gallium cell. The gallium was degassed as above, after which oxygen was introduced into the gallium cell under oxygen pressures of 8.0 mm. hg. and corresponding to a carrier concentration of 1.05×10atoms oxygen/cc. of the gallium arsenide melt later produced. 435.3 g. of degassed arsenic was then vaporized and diffused from the arsenic cell into the gallium cell where the arsenic, gallium and oxygen were reacted under substantially the same conditions recited in Example 1 to form a melt of oxygen-doped gallium arsenide. This melt was soaked for 2 hours then crystallized as in Example 1.

The gallium arsenide ingot obtained in this run was 36.9 cm. long and weighed 839.0 g. This ingot was about 95 percent single crystal material although several twin planes were formed within 5 cm. of the front end of the crystal.

Typical electrical properties of this ingot are shown in Table III below.

TABLE III

| Position on ingot (cm.) | $R_H$ (cm.³/coulomb) | $\rho$ (ohm-cm.) R.T. | $\mu$ (cm.²/volt sec.) | $\eta$ (n-type/cc.) |
|---|---|---|---|---|
| 4.8 | ........ | $1.03\times10^5$ | ........ | ........ |
| 9.8 | ........ | $1.32\times10^5$ | ........ | ........ |
| 10.4 | $-1.59\times10^4$ | 2.691 | 5,920 | $3.96\times10^{14}$ |
| 10.9 | $-1.32\times10^6$ | 2.267 | 5,820 | $4.75\times10^{14}$ |
| 12.0 | $-1.23\times10^4$ | 2.057 | 5,960 | $5.11\times10^{14}$ |
| 14.8 | $-1.79\times10^4$ | 2.839 | 6,280 | $3.54\times10^{14}$ |
| 17.4 | −5,169 | .0568 | 6,030 | $1.21\times10^{15}$ |
| 19.5 | $-3.86\times10^6$ | 682.5 | 5,620 | $2.28\times10^{13}$ |
| 22.3 | ........ | $1.32\times10^6$ | ........ | ........ |
| 25.0 | ........ | $1.43\times10^5$ | ........ | ........ |
| 30.0 | ........ | $1.10\times10^4$ | ........ | ........ |
| 34.2 | ........ | $8.6\times10^5$ | ........ | ........ |

It will be noted that the carrier concentrations, mobilities and resistivities between the 10.4 cm. and 14.8 cm. positions on the ingot have comparable values within the range of those disclosed herein for double-doped gallium arsenide, the total yield of material having these values is only about 13.5 percent of the total ingot, which is too low a yield for satisfactory economical operation

Example 4

This example illustrates an attempt to increase the yield of gallium arsenide ingots doped with oxygen alone over that obtained in Example 3 by decreasing the charge level of oxygen.

Using the same procedure and apparatus as used in Example 3, again omitting the tellurium addition operation, 404.4 g. of gallium were charged to the crucible in the gallium cell. Again, the gallium was degassed as above, after which oxygen was introduced into the gallium cell under oxygen pressures of 5.05 mm. hg. corresponding to a carrier concentration of 6.89×10atoms oxygen/cc. of the gallium arsenide melt subsequently produced. 434.5 g. of degassed arsenic was then vaporized and diffused from the arsenic cell into the gallium cell where the arsenic, gallium and oxygen were reacted under substantially the same conditions recited in Example 3 to form a melt of oxygen-doped gallium arsenide. This melt was then soaked for 2 hours then crystallized as in Example 3.

The gallium arsenide ingot obtained in this run was 37.6 cm. long and weighed 838.0 g. Although the ingot was 80—90 single crystal, there were 15 discernible twin planes therein and a small amount of free gallium on the back end of the ingot. Typical electrical properties of this ingot are shown in Table IV below.

TABLE IV

| Position on ingot (cm.) | $R_H$ (cm.³/coulomb) | ρ (ohm-cm.) R.T. | μ (cm.²/volt sec.) | η (n-type/cc.) |
|---|---|---|---|---|
| 1.0 | −1,924 | .4294 | 4,530 | $3.41\times10^{15}$ |
| 6.0 | −2,106 | .4505 | 4,670 | $3.07\times10^{15}$ |
| 11.0 | −1,759 | .3632 | 4,850 | $3.55\times10^{15}$ |
| 17.0 | −2,518 | .5105 | 4,930 | $2.52\times10^{15}$ |
| 17.8 | −3,447 | .5860 | 5,900 | $1.82\times10^{15}$ |
| 20.5 | −525.6 | .989 | 5,320 | $1.24\times10^{15}$ |
| 23.2 | $-1.46\times10^{4}$ | 2.324 | 6,330 | $4.28\times10^{14}$ |
| 24.6 | $-2.23\times10^{4}$ | 3.792 | 5,910 | $3.03\times10^{14}$ |
| 25.3 | $-5.59\times10^{4}$ | 8.465 | 6,680 | $1.33\times10^{14}$ |
| 26.2 | $-1.39\times10^{5}$ | 195.8 | 7,100 | $3.58\times10^{13}$ |
| 27.4 | $-6.25\times10^{6}$ | 1,114 | 6,840 | $1.17\times10^{12}$ |
| 32.5 | $-8.75\times10^{5}$ | 1,365 | 6,740 | $2.87\times10^{13}$ |
| 34.3 | | $9.1\times10^{5}$ | | |

In this ingot the carrier concentrations and mobilities are satisfactory throughout the ingot. However, only a small portion of the ingot measured at points between the 20.5 cm. and 25.3 cm. positions, which is less than 13 percent yield of the ingot, has resistivities within the range disclosed herein. Again, yields of material with the required resistivities are too small for satisfactory economic operation.

Example 5

This example illustrates the preparation of gallium arsenide double doped with tin and oxygen.

The procedure and apparatus described in Example 1, is used in this example, except modified by adding the tin dopant to the gallium crucible prior to reaction with arsenic, instead of vaporizing the tin into the gallium cell in the manner described for tellurium addition. An amount of elemental tin corresponding to a concentration of $1\times10^{17}$ atoms tin/cc. of the gallium arsenide melt subsequently produced is added to the gallium crucible which is then placed in the gallium cell. Approximately 404 g. of gallium are charged to the crucible and degassed. Oxygen in then introduced into the gallium cell at oxygen pressures of about 11 mm. Hg. The gallium cell is then sealed off from the oxygen supply. With the arsenic and gallium cells connected as described above, the assembly is then placed in the vaporizer and crystallizer furnaces. 434.9 g. of degassed arsenic are then vaporized and diffused from the arsenic cell in the arsenic vaporizer furnace into the gallium cell situated in the crystallizer furnace. The arsenic, tin, oxygen and gallium are reacted under substantially identical conditions as described in Example 1 to form a melt of gallium arsenide double doped with tin and oxygen. This melt is soaked for 2 hours then crystallized as in Example 1

The gallium arsenide ingot obtained in this run is 37.5 cm. long and weighs approximately 830.0 g. The ingot is almost entirely single crystal gallium arsenide and has electrical properties shown in Table V below.

TABLE V

| Position on ingot (cm.) | $R_H$ (cm.³/coulomb) | ρ (ohm-cm.) R.T. | μ (cm.²/volt sec.) | η (n-type/cc.) |
|---|---|---|---|---|
| 1.0 | $-6.45\times10^{5}$ | $1.8\times10^{4}$ | 40 | $0.99\times10^{13}$ |
| 7.0 | −6,552 | 3.18 | 2,100 | $9.7\times10^{14}$ |
| 13.0 | −3,342 | 1.152 | 2,910 | $1.88\times10^{15}$ |
| 19.0 | −14,076 | 2.592 | 5,510 | $4.5\times10^{14}$ |
| 24.0 | −16,143 | 2.922 | 5,670 | $3.9\times10^{14}$ |
| 30.0 | −7,848 | 1.923 | 4,000 | $9.0\times10^{14}$ |
| 34.0 | −1,886 | 0.399 | 4,720 | $3.3\times10^{15}$ |

This ingot is seen to have a high yield of material having electrical properties of the desired values.

Example 6

This example illustrates the preparation of gallium arsenide double doped with selenium and oxygen.

The procedure and apparatus described in Example 1, is used in this example. An amount of elemental selenium corresponding to a concentration of about $5.01\times10^{15}$ atoms selenium/cc. of the gallium arsenide melt subsequently produced is introduced into the gallium cell in the manner described for tellurium in Example 1. Gallium is then charged to the crucible in the gallium cell in an amount of about 407 g. and then degassed. Oxygen is then introduced into the gallium cell at oxygen pressures of about 11 mm. Hg. The gallium cell is then sealed off from the oxygen supply. With the arsenic and gallium cells connected as described above, the assembly is then placed in the vaporizer and crystallizer furnaces. Approximately 437 g. of degassed arsenic are then vaporized and diffused from the arsenic cell in the arsenic vaporizer furnace into the gallium cell situated in the crystallizer furnace. The arsenic, selenium, oxygen and gallium are reacted under substantially identical conditions as described in Example 1 to form a melt of gallium arsenide double doped with selenium and oxygen. This melt is soaked for 2 hours then crystallized as in Example 1.

The gallium arsenide ingot obtained in this run is 37.6 cm long and weights approximately 842 g. This ingot is almost entirely single crystal gallium arsenide and has typical electrical properties as shown in Table VI below.

TABLE VI

| Position on ingot (cm.) | $R_H$ (cm.³/coulomb) | ρ (ohm-cm.) R.T. | μ (cm.²/volt sec.) | η (n-type/cc.) |
|---|---|---|---|---|
| 1.0 | | $6.4\times10^{6}$ | | |
| 6.0 | $-4.20\times10^{4}$ | 7.80 | 5,380 | 1.5( $\times10^{14}$ |
| 11.0 | −2,363.2 | 389.2 | 5.82 | $2.7\times10^{15}$ |
| 16.0 | −9,408 | 2.596 | 3,600 | $6.8\times10^{14}$ |
| 21.0 | −4,748 | 2.296 | 2,020 | $1.46\times10^{15}$ |
| 26.0 | −5,760 | 1.280 | 4,540 | $1.11\times10^{15}$ |
| 31.0 | −683.6 | 0.816 | 840 | $9.2\times10^{15}$ |
| 36.0 | −446.2 | 1.332 | 240 | $1.44\times10^{16}$ |

The electrical properties shown in the above table are indicative of the high yield of material having the desired properties in the gallium arsenide ingot double doped with selenium and oxygen.

The above examples are particularly illustrative of the provision of high yields of double-doped gallium arsenide having reproducible electrical properties suitable for use in semiconductor devices and, particularly, in Gunn-effect devices. Resistivities shown in these examples predominate in the range of from 1—15 ohm-cm. for double-doped gallium arsenide and are within the range of resistivities particularly desired in Gunn-effect devices. Resistivities within a broader range of from 1—200 ohm-cm. are suitably prepared by various modifications in operating conditions and reaction parameters. For example, gallium arsenide double doped with oxygen and germanium to a net carrier concentration of about $6.25\times10^{12}$ carriers and having an electron mobility on the order of 5000 cm.²/volt sec. has a resistivity of 200 ohm-cm. Likewise, gallium arsenide having a resistivity of 10 ohm-cm. and an electron mobility on the order of 5000 cm ²/volt sec. is obtained when double doped with sulfur to a net carrier concentration of about $1.25\times10^{13}$. It is to be understood that in these illustrations using germanium and sulfur as the codopant with oxygen, that essentially the same or similar resistivities are obtained when tin, selenium or tellurium are used in place of the germanium and sulfur, respectively. Resistivities are also affected by varying the gallium arsenide melt soaking temperatures and times.

As indicated above, double-doped gallium arsenide prepared according to this invention may be used in various semiconductor devices and is particularly useful in Gunn-effect devices. In the illustrative examples which follow are shown various embodiments of Gunn-effect microwave oscillators.

Example 7

A Gunn-effect microwave oscillator is made by lapping a slice of N-type GaAs double doped with Te and $O_2$ to a thickness of 80 microns. The resistivity of the GaAs is about 2.60 ohm-cm. and electron mobility about 6150 cm.² /volt sec. The doping level of the slice is about $3.93\times10^{14}$ net carriers.

The lapped slice is etched in a 1 Br-in-methyl alcohol solution for 5 minutes to polish faces and remove mechanical damage on the surfaces of the slice. The etch is quenched with alcohol and the device is immediately placed in a vacuum evaporator, and a transparent gold film is deposited on the slice. The slice is then removed and placed in an acid electroless nickel plating solution; after about 1,000 A. have plated onto the surfaces, the slice is rinsed in alcohol. The slice is returned to the evaporator for deposition of~500 A. tin. The slice is then tin-electroplated in $SnCl_2$ plating solution. When the tin plate thickness reaches about 25 microns, the slice is dipped in alcohol, blotted and placed in an alloying stage. The stage enclosure is evacuated and flooded with forming-gas bubbled through HCl. The stage temperature is raised to 400° C. and held 10 seconds to alloy the contact material and the GaAs.

A one mm.² die, cut from the above slice, is mounted on a 06 brass machine screw using soft solder. The screw serves as a heat-sink and a tunable mount in the microwave cavity.

To use the device, the above unit containing the GaAs die is placed in a suitable resonant cavity. The cavity is formed by a quarter wave length stub which provides a resonance at the design frequency; for the 80 $\mu$ thick sample this is 1.25 gigahertz. Direct current voltages up to several hundred volts are supplied to the device by means of a high power pulse generator and matching transformer. The output of the device is then determined by a suitable high frequency electromagnetic spectrum analyzer and a microwave power motor.

Performance characteristics of the above device are shown below.

| Parameter | Value |
|---|---|
| Frequency at peak power | 1.275 GHz. |
| DC voltage at peak power | 100 volts |
| Peak Power output ($10^{14}$ duty cycle) | 4 watts |
| Threshold for onset of oscillations | 5000 volt/cm. |
| Burnout voltage | 100 + volts |

Example 8

A Gunn-effect oscillator utilizing a die of N-type GaAs double doped with tin and oxygen to a concentration of about $4.5\times10^{14}$ net carriers and having a resistivity of 2.592 ohm-cm. and mobility of 5,510 cm.²/volt sec., is prepared as described in Example 7.

Performance characteristics of the oscillator device are shown below

| Parameter | Value |
|---|---|
| Frequency at peak power | 1.225 GHz. |
| DC voltage at peak power | 100 volts |
| Peak power output ($10^{14}$ duty cycle) | 8 watts |
| Threshold for onset of oscillation | 4375 volt/cm. |
| Burnout voltage | 100 + volts |

Example 9

A die of N-type GaAs double doped with oxygen and selenium is used in the Gunn-effect microwave oscillator in this example. The oscillator is prepared as described in Example 7. The electrical characteristics of the double-doped GaAs are as follows: net carrier concentration, ca $6.8\times10^{14}$; resistivity, ca 2.595 ohm-cm. and electron mobility, ca 3600 cm.²/volt sec.

Performance characteristics of this microwave oscillator are shown below:

| Parameter | Value |
|---|---|
| Frequency at peak power | 1.195 GHz. |
| DC voltage at peak power | 150 volts |
| Peak power output ($10^{14}$ duty cycle) | 5 watts |
| Threshold for onset of oscillation | 3370 volts/cm. |
| Burnout voltage | 150 + volts. |

Various types of apparatus, equipment and reactor assemblies and materials which may be used to carry out the invention herein are contemplated. Illustrative of the contemplated apparatus or equipment in which the process of this invention may be performed is the use of a gradient-freeze crystallization reactor assembly wherein pyrolytic boron nitride or other material, inert under reaction conditions, is used as the crucible or boat to contain the gallium arsenide melt. As the arsenic cell-gallium cell unit a combination reactor tube can be used wherein a Mullite (e.g. McDanel Type MV-33) section is used as the gallium cell material in the high temperature crystallizer furnace and an aluminosilicate glass (e.g., Corning 01720) section is used as the arsenic cell material in the lower temperature arsenic vaporizer furnace. The combination of the Mullite and aluminosilicate glass is especially suitable because their thermal expansion coefficients are sufficiently similar to permit sealing of the two section together and use of the seal within the temperature range of from 0° C. to 750° C. This contemplate reactor assembly, of course, is useful in almost any chemical process where it is desired or required to carry out proximal operations under high and low temperature conditions. Gradient-freeze crystallizations, recrystallizations, and doping combinations of other compound semiconductor materials such as the II–VI and other III–V compounds are contemplated as processes or reactions which can be carried out in the contemplate reactor assembly and modifications thereof.

Various modifications of the instant invention will occur to those skilled in the art without departing from the spirit and scope thereof.

What we claim is:

1. Gunn-effect microwave oscillator devices utilizing gallium arsenide double doped with oxygen and an element selected from the group consisting of germanium, tin, sulfur, selenium and tellurium to a net carrier concentration of up to about $5\times10^{15}$ carrier/cc., and having resistivities within the range of from about 1 to 200 ohm-cm. and electron mobilities of at least 2,000 cm.²/volt sec.

2. Gunn-effect microwave oscillator devices according to claim 1 wherein said gallium arsenide is double doped with oxygen and tellurium.

3. Gunn-effect microwave oscillator devices according to claim 2 wherein said double-doped gallium arsenide has resistivities within the range of from 1—15 ohm-cm.